(No Model.) 9 Sheets—Sheet 2.
L. P. HOYT.
CHAIN FEED SURFACING AND SIZING MACHINE.
No. 344,836. Patented July 6, 1886.
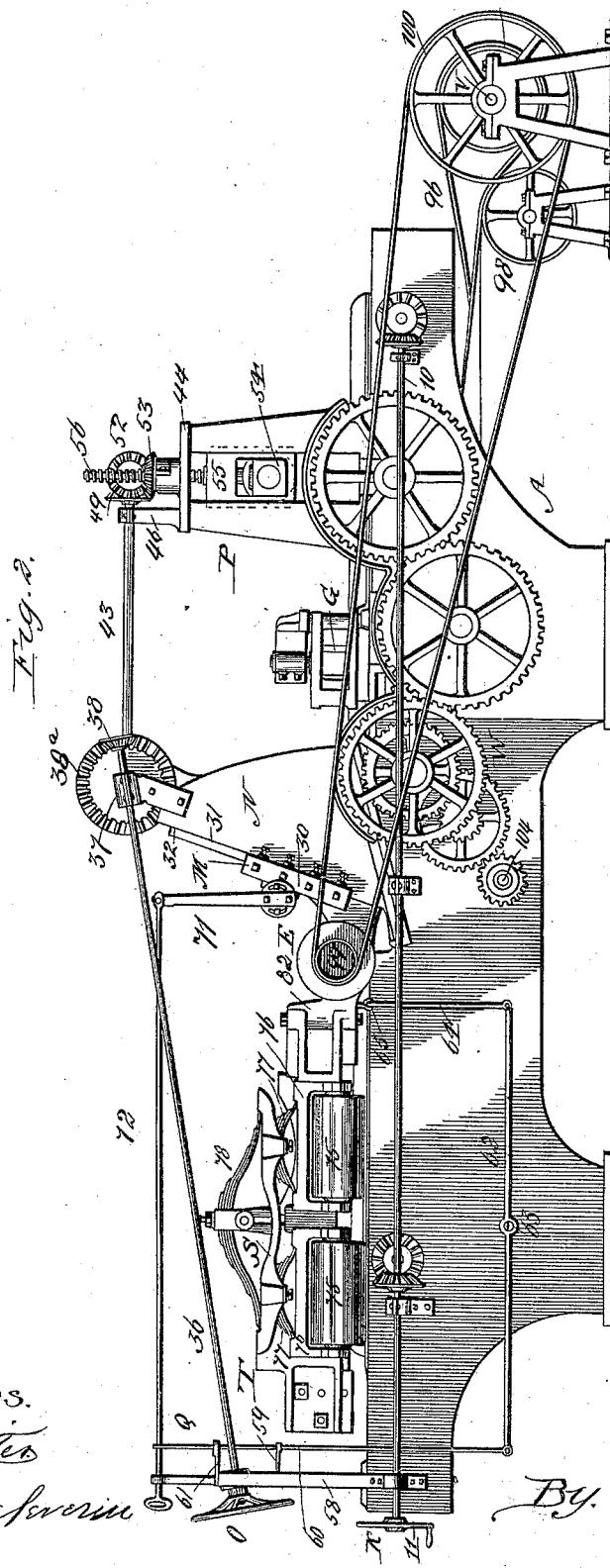
Witnesses.
W. Rossiter
Frank N. Severin
Inventor
Lucius P. Hoyt
By Chas. F. Page
Atty.

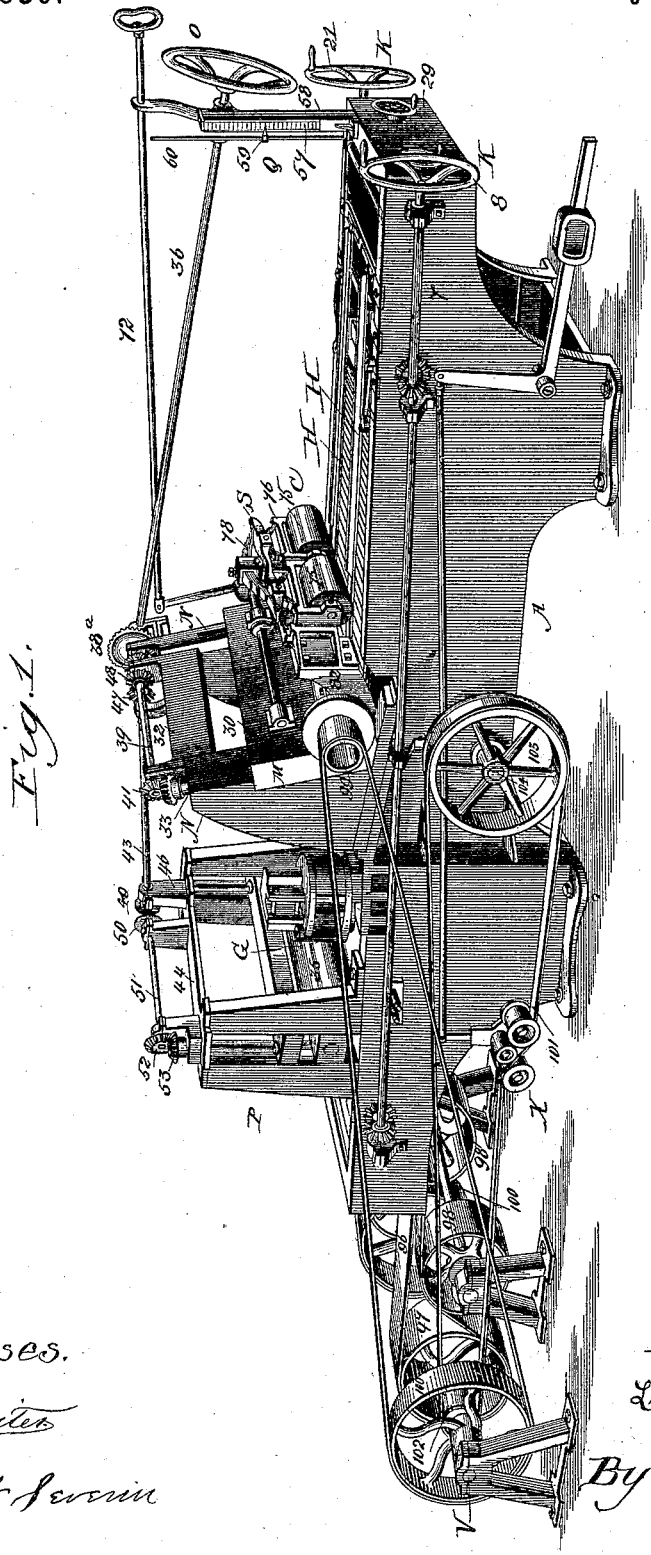

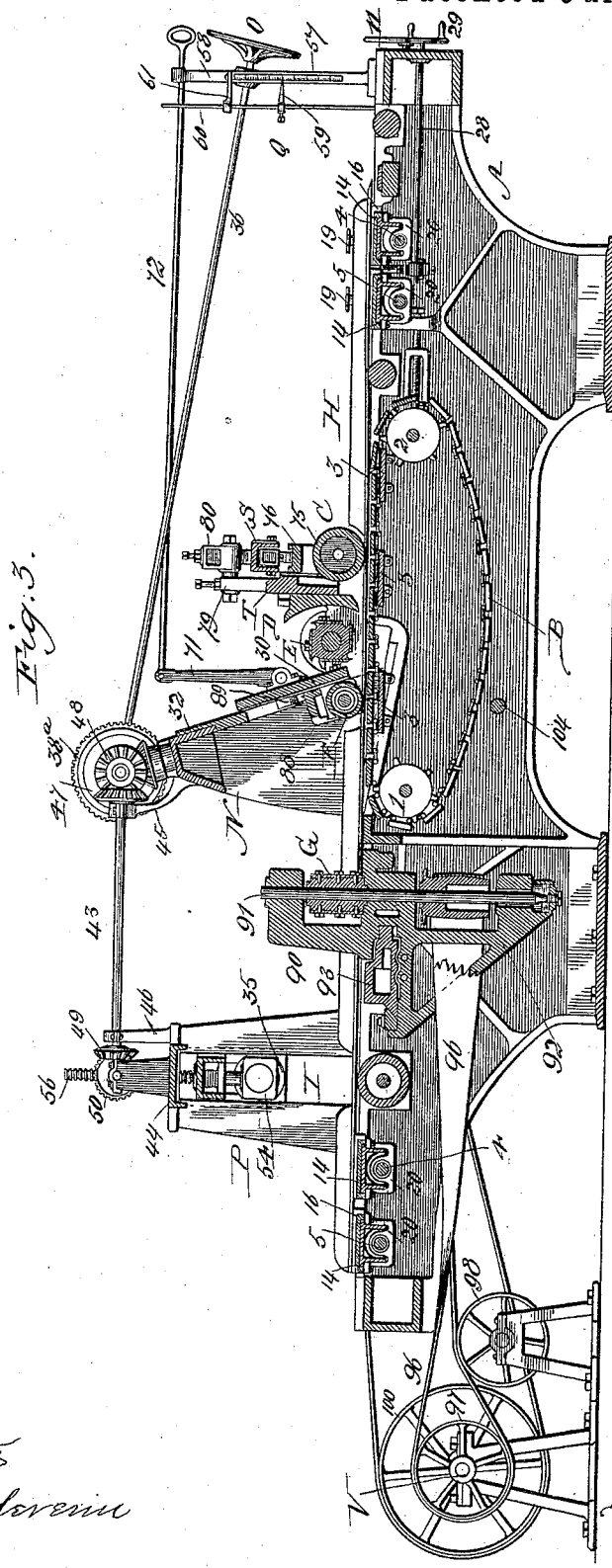

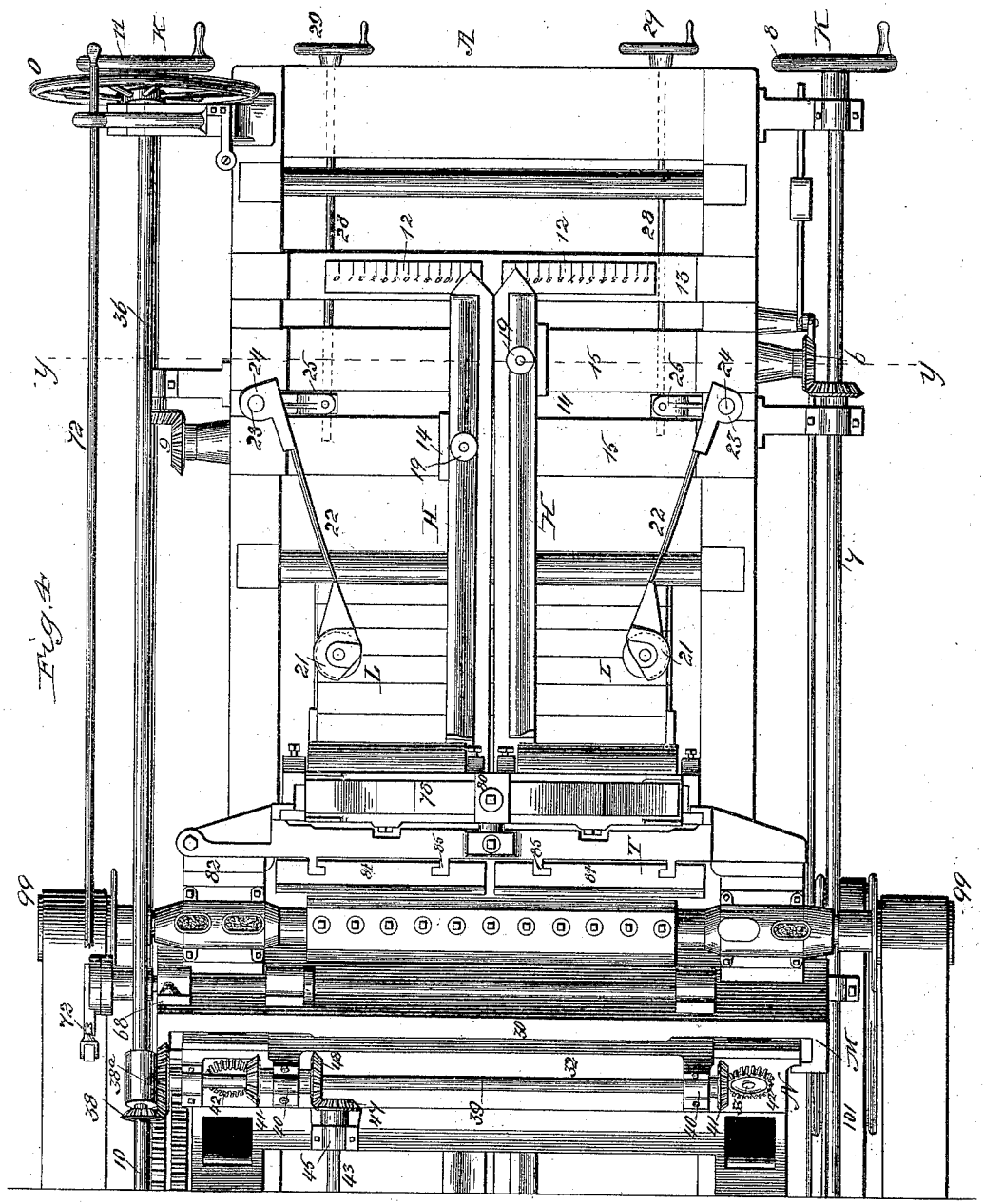

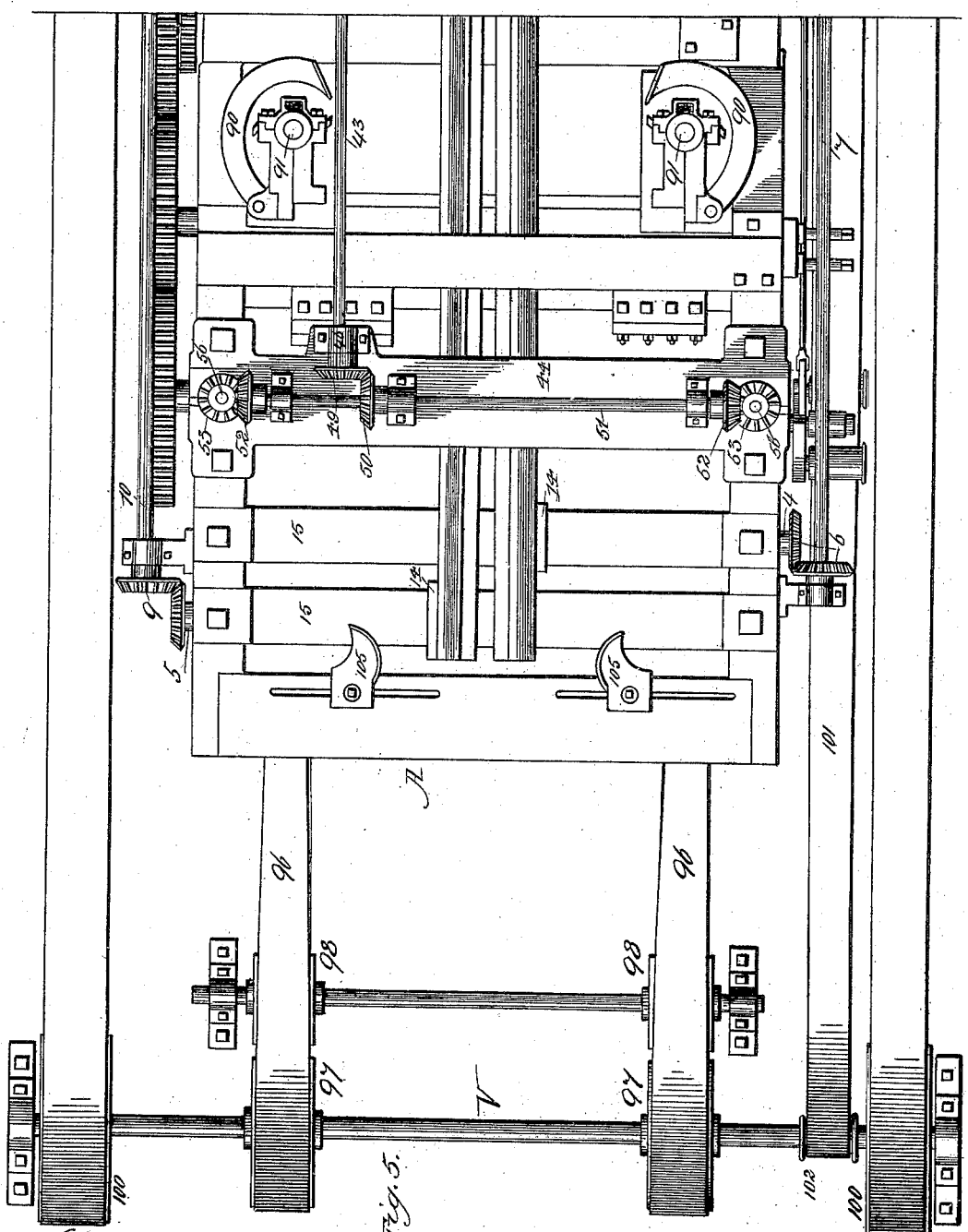

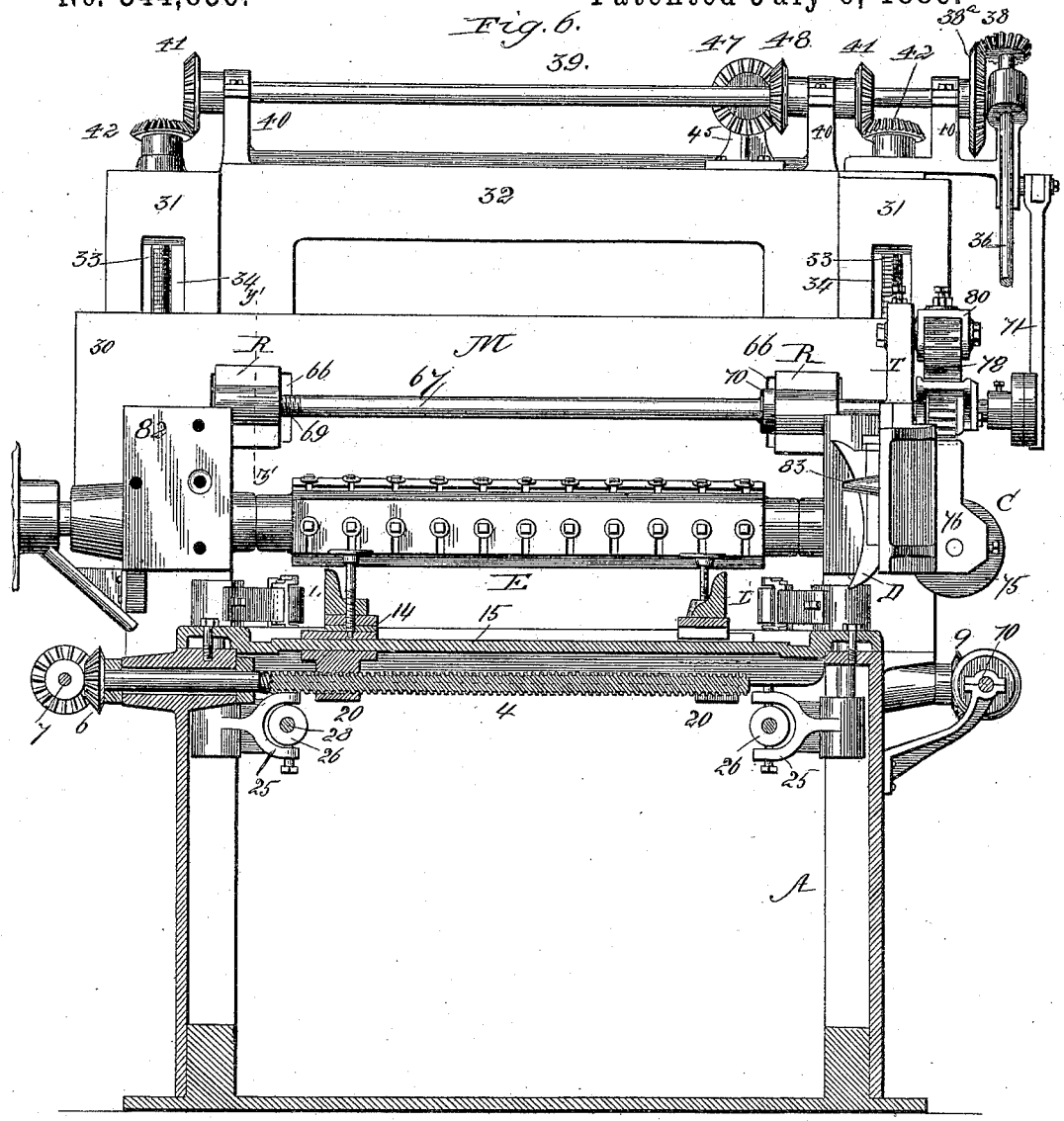

(No Model.) 9 Sheets—Sheet 7.
L. P. HOYT.
CHAIN FEED SURFACING AND SIZING MACHINE.
No. 344,836. Patented July 6, 1886.
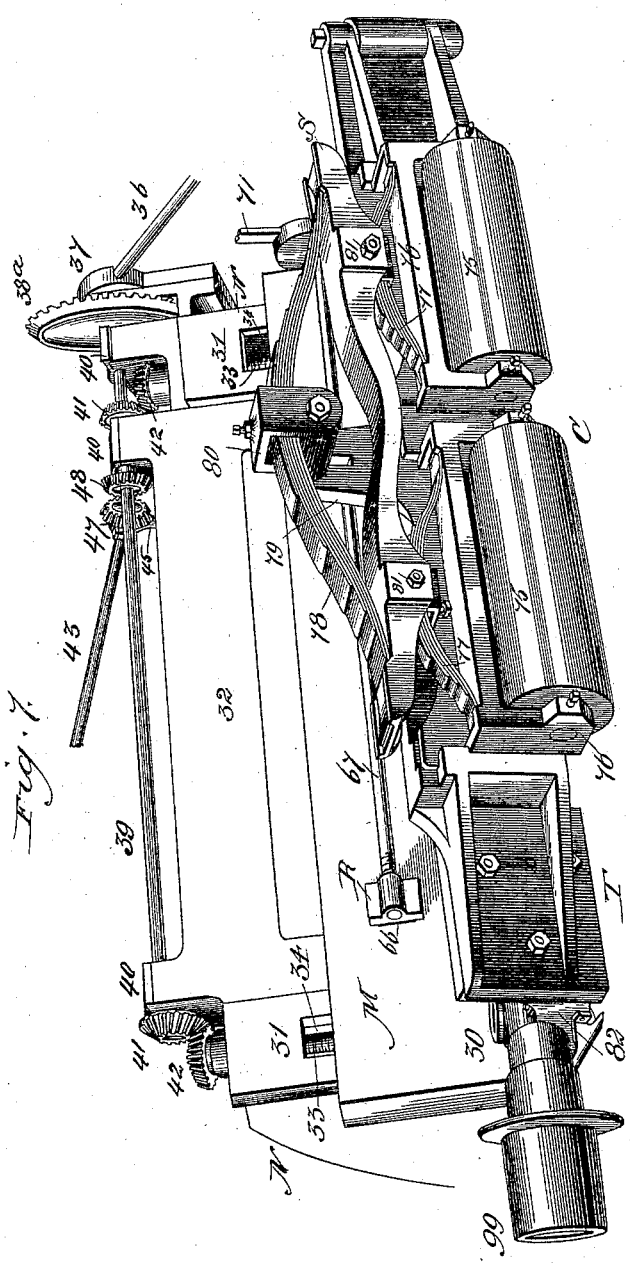
Witnesses.
W. Rossiter
Frank W. Severin
Inventor.
Lucius P. Hoyt
By Chas. G. Page
Atty.

(No Model.) 9 Sheets—Sheet 8.
L. P. HOYT.
CHAIN FEED SURFACING AND SIZING MACHINE.
No. 344,836. Patented July 6, 1886.
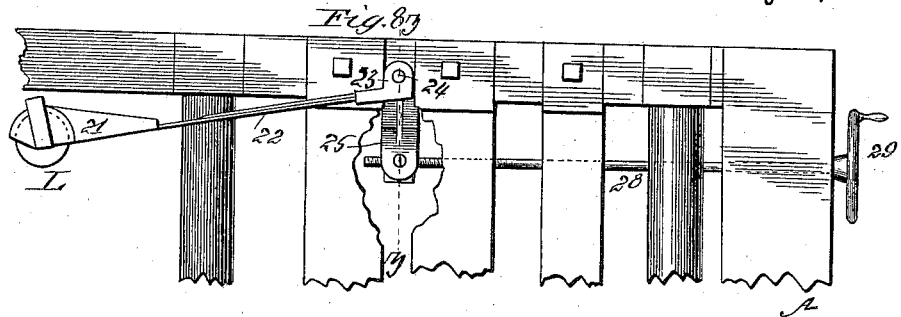
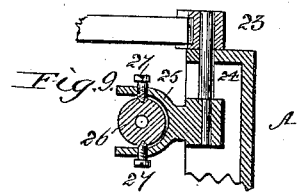
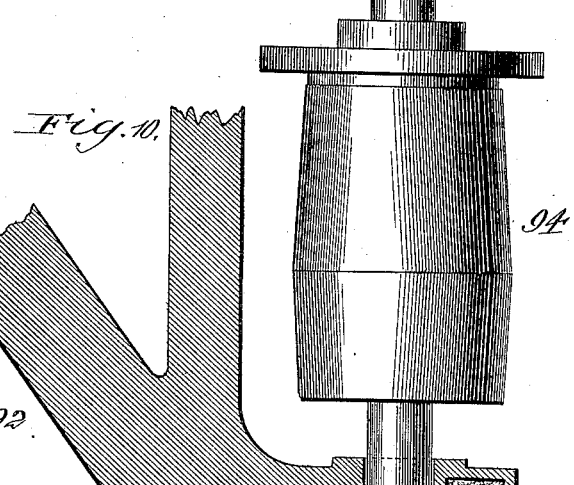
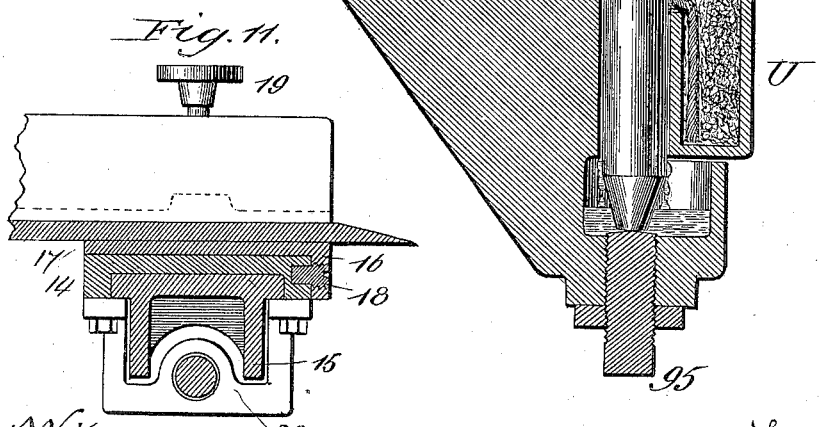
Witnesses.
Inventor.
Lucius P. Hoyt
By Chas. G. Page
Atty.

(No Model.) 9 Sheets—Sheet 9.
L. P. HOYT.
CHAIN FEED SURFACING AND SIZING MACHINE.
No. 344,836. Patented July 6, 1886.
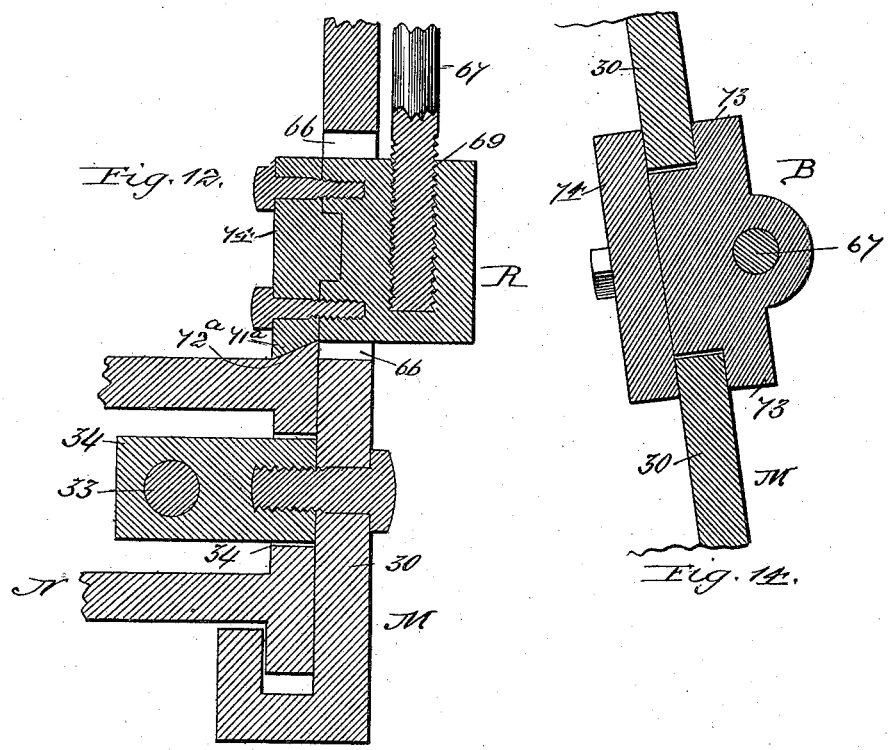
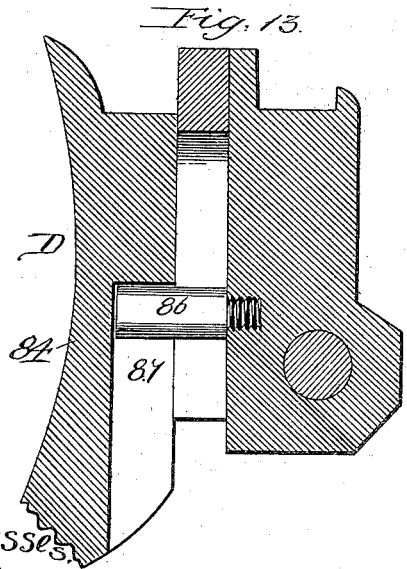

UNITED STATES PATENT OFFICE.

LUCIUS P. HOYT, OF AURORA, ILLINOIS.

CHAIN-FEED SURFACING AND SIZING MACHINE.

SPECIFICATION forming part of Letters Patent No. 344,836, dated July 6, 1886.

Application filed October 20, 1885. Serial No. 180,403. (No model.)

*To all whom it may concern:*

Be it known that I, LUCIUS P. HOYT, a citizen of the United States, residing at Aurora, in the county of Kane and State of Illinois, have invented certain new and useful Improvements in Chain-Feed Surfacing and Sizing Machines, of which the following is a specification.

My invention relates more particularly to a machine adapted for dressing down lumber, with special reference to a reduction of the dimensions and weight, and herein designated as a "chain-feed surfacing and sizing machine," in contradistinction to planing or planing and matching machines employed to plane off the side surfaces of the boards, or to plane the side surfaces and match the edges.

The object of my invention, generally stated, is to provide an improved and efficient construction of machine for sizing or dressing down lumber to an extent variable, so far as may be necessary with each individual piece, but determinate in each and every instance, whereby, preparatory to shipment, the aggregate weight of the lumber to be shipped can be brought within the smallest compass compatible with the size of material necessary to fill the order, and hence a saving effected in the cost of freight, which, particularly in the event of a shipment from a saw-mill, for example, to some remote point, becomes a matter of considerable importance.

Special objects herein involved and more particularly stated are, to provide means whereby the capacity of the machine can be adjusted at will for dressing down either two pieces of lumber of equal or unequal width at one and the same time, or for dressing down the pieces separately regardless of their width; to provide efficient means whereby such adjustment of the capacity of the machine can be quickly and conveniently made either while the machine is in motion or when it is at a state of rest, and thus permit the operator or attendant to make a ready note of the width of the lumber as it is brought to the machine, and to adjust the capacity of the latter accordingly; to provide a novel and improved arrangement of hinged gate for supporting a pressure-roll and a chip-breaker in an effective position relative to the horizontally-arranged cutter-cylinder that is herein employed to reduce the lumber in thickness, and at the same time to permit the said gate carrying the pressure devices to be readily and conveniently swung away from the cutter-cylinder in a manner to allow free access to be had to the latter for the purpose of sharpening the knives; to provide novel and effective means subject to the control of an operator standing at the feed end of the machine and adapted for locking in adjustment the adjustable support or cross-head that is employed for raising and lowering the horizontal cutter-cylinder; to provide an efficient adjusting mechanism placed under the control of an operator standing at the feed end of the machine, and serving to raise and lower both the cutter-cylinder and one of a pair of feeding-out rolls simultaneously and with reference to the thickness of the lumber, and also in this connection to provide convenient means whereby the height of the said cutter-cylinder can be readily and accurately determined; to provide an improved organization of driving-pulleys, idler-pulleys, and vertical spindles for the side cutter-heads, whereby the two leaves of a belt connecting a driving-pulley with the pulley upon a side cutter-head spindle shall pass back horizontally from the latter, so as to exert a pull thereon at right angles to the axis of the spindle, avoiding, therefore, any tendency to cause the lower end of the spindle to bear with undue force upon the bearing in which it is stepped, insuring a steady action, and permitting the employment of a steel bearing, such as hereinafter described, for the lower end of the spindle to rest upon; to provide certain novel and improved details, all tending to the general efficiency of the machine, and to organize the several operative members in a manner whereby the machine may be belted entirely from a single counter-shaft arranged beyond the delivery end, and the motion and several adjustments be controlled by an operator standing at the feed end of the machine.

In carrying out my invention I use a horizontally and transversely arranged cutter-cylinder, two oppositely-arranged rotary cutter-heads, and a pair of feeding-out rolls, which said elements, with regard to their respective points of location, are disposed after the manner of the upper facing-cylinder, the matcher-heads, and the feeding-out rolls found in a known form of planing and matching machine, in which latter, however, the working capacity of the machine is equal to but one board at a time, whereas in the present machine devices are associated with the side cutter-heads which adapt it for dressing down both in width and thickness either one or two pieces of lumber at one and the same time. I also prefer to use an endless slatted chain bed, a spring-controlled self-adjusting divided pressure-roll, and a clip-breaker, for purposes similar to those of corresponding devices found in planing-machines of that class wherein two boards can be operated upon simultaneously, but in which no provision has been made for dressing the lumber other than along its side surface.

In order to provide for dressing down either one or two pieces of lumber both in width and thickness, and for varying the capacity of the machine relatively to the number and width of the pieces, and to the ultimate required size of the timber, I provide two laterally and independently adjustable guides arranged longitudinally along the machine and placed between the oppositely-arranged side cutter-heads, so that each guide may be adjusted toward or away from the cutter-head to which it is more directly opposed. By means of this association of the guides with the cutter-heads the capacity of the machine can be changed by adjusting the guides and without shifting the cutter-heads. The width of the two defined spaces between the cutter-heads and the guides can be varied to accommodate two pieces of timber, each of which will be reduced in width by the action of one of the two cutter-heads, while both pieces will be reduced in thickness by the action of the single cutter-cylinder. Again, both guides may be moved over toward one of the cutter-heads, and thereby provision made for dressing down a single wide piece of lumber.

While various mechanical devices could be employed for separately shifting to the required extent the laterally-movable guides, the devices herein preferably employed and shown for controlling the position of the laterally-movable guides consist of two oppositely-arranged rotary side rods, each geared to two of four transversely-arranged adjusting-screws, which latter are connected with the guides in a manner to actuate the same, and also to permit the guides to be readily removed when it is desired to use the machine for any other purpose to which it may be put.

The cutter-cylinder is mounted on the front side of a vertically-adjustable cross-head, which also carries a swinging gate or frame conveniently hinged to one of the boxes for the cutting-cylinder journals. This gate or frame, when in a closed position, stands in front of the cutter-cylinder, and provides an improved support not only for the divided pressure-roll and its adjuncts, but also for the chip-breaker or pony-rolls, which may be regarded as an equivalent thereof. The chip-breaker, although carried by the gate, is self-adjusting in height independently of the latter, provision for limiting the extent of drop of the chip-breaker being made by means of suitably-arranged stops. The divided roll is likewise self-adjustable in height independently of the gate; but at the same time both the divided pressure-roll and the chip-breaker are subject to a common adjustment in height, attained by an adjustment of the cross-head. The gate or frame, which is thus equipped with the divided pressure-roll and a chip-breaker, will, when closed or brought into a position in front of the cutting-cylinder—that is to say, nearest in position to the feed end of the machine—be locked at its free end to one of the cutting-cylinder journal-boxes or a suitable bracket thereon, and will stand in a vertical plane parallel to the cutter-cylinder, thus bringing the divided pressure-roll and the chip-breaker into a proper position relatively to and in advance of the cutter-cylinder, and also affording for such members a substantial bearing extending down to the lowest permissible point above the chain bed, so as to avoid all danger of the chip-breaker being forced into the field of action of the cutter-cylinder as an incident to long use and wear of parts, and by avoiding long leverage between the axes of the pressure-roll sections and the lowest bearing-point of the frame permit the housings for said sections to work freely up and down under the self-adjusting spring-resistances. The presence of these devices in front of the cutter-cylinder renders it impossible to get at the latter to any practical extent so long as the gate or frame is in front of and parallel with the cutter-cylinder, while on the other hand the presence of the side cutter-heads beyond or back of the cutter-cylinder, the construction of horns or supports necessary for supporting the cross head, the cross-head itself, which stands back of the cutter-cylinder—that is to say, in point of location nearer the delivery end of the machine—and a spring-controlled pressure-roll, which is mounted at the rear side of the cross-head, all render it equally impracticable to attain access to the cutter-cylinder from the rear. The gate or frame which carries the pressure-roll and chip-breaker, and which is hinged, as hereinbefore mentioned, can, after its free end has been unlocked, be moved away from its position in front of the cutter-cylinder and swung laterally away from the cutter-cylinder and to one side of the machine, thus fully and fairly exposing the cutter-cylinder, and leaving no obstruction whatsoever in front of the same. The cross-head is secured in its adjustment by a simple and readily-operative device placed under control of an operator standing at the feed end of the machine, and is likewise raised and lowered by a mechanism controllable in a similar way. These devices will be hereinafter particularly explained in detail.

The pulleys of the cutting-cylinder are belted from a counter-shaft arranged beyond the delivery end of the machine, as are also the spindles of the side cutter-heads, and a driving-shaft which is gear-connected with the driving-sprockets for the chain bed and with the lower one of the feeding-out rolls.

The counter-shaft, to be available to all of the devices to be driven therefrom in this machine, and also to be available for the belting connected, for example, with power overhead, is supported in bearings that are arranged upon the floor at a point beyond the tail or delivery end of the machine, the said counter-shaft being considerably lower than the axis of the cutter-cylinder.

The belts that connect pulleys on the axle or journals of the cutter-cylinder with pulleys upon the counter-shaft incline downwardly from the same to said pulleys upon the counter-shaft. If the up-and-down adjustment of the cutter-cylinder were strictly vertical, a limited upward adjustment would tighten up the belts to too great an extent; but by arranging the cross-head which carries the cutter-cylinder so that it (the said cross-head) shall work up and down along the inclined front faces of a pair of horns constructed so that the said faces shall lean toward the delivery end of the machine, the up-and-down movement of the cross-head, and consequently of the cutter-cylinder carried thereby, will more nearly proximate to a movement concentric to the counter-shaft, it being obvious that when the cross-head is, for example, raised from its lowest position the pulleys of the cutter-cylinder will not be moved so abruptly in a direction away from the counter-shaft, as would be the case if said movement were vertical.

The feature of belting the machine entirely from a single counter-shaft placed beyond the delivery end of the machine involves a convenient and economical application of power, and provides increased facilities for placing the several devices for controlling the motion and the adjustment under control of an operator at the feed end of the machine. An advantage is also attained by thus belting the spindles of the side cutter-heads, in that, by means of idler-pulleys arranged just in front of the counter-shaft pulleys, the belting from the spindles can be run back horizontally, so as to permit the spindles to be stepped in bearings, as will be more fully explained hereinafter.

Various other details of improvement will also be hereinafter described in referring by letters to the drawings, in which—

Figure 1 represents in perspective a machine constructed in accordance with the principles of my invention. Fig. 2 represents the same in side elevation, and shows the side opposite to that illustrated in the preceding figure. In this view the hinged gate or frame carrying the divided pressure-roll is represented as having been swung away from its usual position in front of the cutter-cylinder and moved into a position at one side of the machine. Fig. 3 represents a longitudinal section taken on a vertical plane through the machine, one of the side cutter-heads which is included in this view being also shown in vertical section. The counter-shaft and belt-pulleys thereon arranged beyond the delivery end of the machine are shown in elevation. Fig. 4 represents on a larger scale a top plan view of the forward or feed end half of the machine. Fig. 5 is a like view of the remaining delivery-end half of the machine. Fig. 6 represents a section taken transversely through the machine on a vertical plane indicated by the line Y Y, Fig. 4, and shows in elevation the visible members that are back of such point—that is to say, nearer in point of position to the delivery end of the machine. Fig. 7 is a detail perspective, mainly representing the hinged frame or gate provided with the self-adjusting divided pressure-roll, and also the cross-head and cross-head supports that are arranged back of the said frame or gate. Fig. 8 is a top plan detail of one of the feed-end corner portions of the machine with a portion broken away to more clearly exhibit the mechanism for adjusting one of the side spring-pressure arms. Fig. 9 is a detail section taken on line Z Z, Fig. 8. Fig. 10 is an enlarged detail, in part section and part elevation, showing the spindle of one of the side cutter-heads and the way in which it is stepped. Fig. 11 is a detail, in part elevation and part section, showing the front end portion of one of the guides and the slide or saddle by which said guide is adjustably and removably held upon a cross-bar of the main frame. Fig. 12 is a transverse horizontal section through a portion of the cross-head which supports the cutter-cylinder and one of the horns or supports for the cross-head. Fig. 13 is a detail section taken vertically through the frame or gate and a portion of the chip-breaker, with a view of illustrating one of the stops for limiting the extent of drop on the part of the chip-breaker. Fig. 14 is a detail section on line $z'$ $z'$, Fig. 6, and shows a portion of the cross-head and a locking-piece for securing the latter in its adjustment.

The main frame A is suitably constructed with reference to the general character of the machine and the desired disposition of bearings for the several operative members.

The endless slatted chain bed B is sustained upon and driven by appropriately-arranged sprockets—for example, as in Fig. 3, wherein one of the driving-sprockets, 1, and one of the adjustable idler-sprockets, 2, are shown. The upper leaf or portion of the endless slatted chain bed passes over appropriately-arranged bed-pieces 3 and under the divided pressure-roll C, the chip-breaker D, the cutter-cylinder E, and the spring-controlled pressure-roll F, which last four members are, in the order herein named, arranged over the said feed-bed successively at points progressive with respect to the direction of feed.

The cutter-cylinder E is designed to reduce the thickness of the lumber fed through the machine, and is arranged horizontally over and transversely to the feed-bed.

The two oppositely-arranged rotary side cutter-heads, G, for reducing the width of the lumber, are desirably located back of the cutter-cylinder and feed-bed, and may be stationed apart at a distance suitable to permit the passage of two pieces of lumber at a time.

The laterally-adjustable guides H H extend nearly the entire length of the machine, and are arranged to pass between the two oppositely-arranged side cutter-heads. These guides are susceptible of lateral movement independently of each other, and likewise independently of the side cutter-heads, in which way the guides can be set so as to leave alongside each cutter-head space suitable for a single width of lumber, and thus permit two pieces of lumber of either equal or unequal width to be run through the machine at one and the same time, and simultaneously dressed down both in thickness and in width by the respective actions of the cutter-cylinder and the rotary side cutters; or, if desired, both guides may be shifted toward one of the side cutter-heads, so as to adjust the capacity of the machine for a single piece of timber—wider, for example, than either of two pieces ordinarily admissible together. The form of guide desirably employed is that of a flat bar or rail provided from end to end with an upturned flange of a width proportioned to the height of guide required. The upright flange portions of these guides are cut away at the points where the guides pass under the divided pressure-roll, the chip-breaker, the cutter-cylinder, the pressure-roll F, and the upper one of the feeding-out rolls I, so as to permit said members to be lowered to a desired extent.

The two guide-adjusting mechanisms K K are similar to each other in construction and operation, but with regard to their disposition are arranged so that one may be operated by a hand-wheel at one of the feed-end corners of the machine and the other operated from a hand-wheel at the opposite feed-end corner, in which way a sufficient correspondence in position between each guide and its allotted actuating mechanism is established to permit the ready identification of the mechanism allotted to a particular guide. With reference to these mechanisms in detail, one guide is adjusted laterally in either direction by means of the two transversely-arranged adjusting-screws 4 4, and the other guide is similarly adjusted by means of the two transversely-arranged adjusting-screws 5 5. The screws 4 4 are respectively arranged adjacent to the opposite ends of the guide which they control, and the screws 5 5 have a like disposition with reference to the remaining guide. The screws 4 extend through bearings at one side of the main frame, and are connected by bevel-gears 6 with a long rod, 7, which is arranged to turn in bearings at this side of the machine, and provided at the feed end of the latter with a crank or hand-wheel, 8. In like manner the screws 5 extend through bearings at the opposite side of the machine, and connect by bevel-gears 9 with a long rod, 10, arranged to turn in appropriate bearings, and provided at the feed end of the machine with a hand-wheel, 11.

The foregoing arrangement of devices provides simple and efficient means for separately adjusting the guides, and insures a uniform movement throughout the entire length of the latter.

The exact desired capacity of the machine is determined by the scales 12, Fig. 4, arranged along a cross-bar, 13, under the front ends of the guides, which latter are adapted to provide pointers with reference to the said scales. It will be observed the scales are in duplicate, so that one may be allotted for each guide.

As a means for permitting the removal of either or both guides from the machine, the front and rear end portions of the guide are seated upon slides or saddle-pieces 14, that are arranged to slide along cross-bars 15 of the main frame, and adjusted in position thereon by means of the adjusting-screws of the guide-adjusting mechanism K K. The construction and arrangement of the saddle-pieces, the cross-bars 15, and the adjusting-screws will be readily understood by referring to Figs. 3, 6, and 11, the first of which illustrates all four of said organizations, while the two latter show the two designed for the front ends of the guides. Each guide is provided with two pendent lugs or lips, 16, respectively arranged to fit against the front sides of the front and rear saddle-pieces, upon which the guide is to rest. These lugs or lips may be integral with the guides, or can be formed with plates 17, secured to the under side of the flat base portion of the guides, as may be preferred. (See, especially, Fig. 11.) The saddle-pieces for the guides are provided in their front sides with double sockets to receive dowel-pins 18, with which the lugs or lips 16 are provided, in which way a limited forward end movement on the part of the guides will be necessary in order to free the dowel-pins from the sockets and permit the detachment of the guides from their said respectively allotted saddle-pieces. Further connection between the guides and the front saddle-pieces is attained by hand-screws 19, arranged to work through the base portions of the guides and screw into sockets on the saddle-pieces when the guides are in position to bring the screws into register with the said sockets.

The feature of the hand-screws 19 is herein allotted to the forward end of each guide only, and may be dispensed with at the rear ends of the guides, since their presence at the front ends thereof, while serving in conjunction with the lugs 16 to retain the guides in place upon the saddle-pieces, locates within reach of an operator at the feed end of the machine devices for locking the guides upon the sliding saddle-pieces.

Each cross-bar 15 is desirably channeled along its under side, so as to receive the nut proper, 20, of a piece that is conveniently bolted to the saddle-piece allotted to such cross-bar. The nuts, which are thus practically made component parts of the sliding saddle-pieces, are severally engaged by the adjusting-screws 4 and 5 of the guide-adjusting mechanisms, and by reason of their disposition within the channels permit the adjusting-screws to likewise lie and operate within the channels, thereby protecting said members from chips and dust.

The two spring-controlled side pressure-rolls, L, for bearing against the edges of the lumber near the point of entrance, in order to hold the lumber up against the guides, are respectively arranged at opposite sides of the machine, each being in opposition to one of the two guides. These side pressure-rolls, L, are carried by boxes or bearings 21, arranged at the free ends of the spring-arms 22, which, while permitting a latitude of self-adjustment of the rolls proportional to their spring action, may be swung round either way about vertical axes, in order to provide for a greater range of adjustment on the part of the rolls. The mechanisms for thus adjusting the positions of the spring-arms 22 are alike, so that a description of one will serve for both. To such end the spring-arm (see Figs. 8 and 9) is secured at its inner end to a hub, 23, fixed upon a vertical spindle, 24, at a point above the main bed-frame of the machine. The spindle 24 is provided at a point under the main bed-frame with a yoke-arm, 25, within which latter a nut, 26, is swiveled or pivoted by the vertically-arranged pivots 27. This nut is engaged by the threaded end portion of a horizontally-arranged rod, 28, which is extended to and through the feed end of the main frame and provided with a handle or hand-wheel, 29, within convenient reach of the operator. By pivoting the nut within the yoke-arm a desired extent of swing is allowed the latter, and hence by turning the rod 28 the spring-arm can be swung either way, according to the direction in which the rod is turned.

The cross-head M, whereon are cast or secured the boxes 30 for the journals of the cutter-cylinder, consists of a plate which is adjustably held against the front inclined guide-faces, 31, of a pair of standards or horns, N, which rise from the main frame respectively at opposite sides of the machine. The horns are desirably formed of hollow castings, and are connected together by a cross plate or bar, 32, which, in conjunction with the horns, serves to provide a substantial frame adapted to afford bearings for the adjusting-screws 33, by which the cross-head is raised and lowered. The adjusting-screws 33 extend down through the hollow horns and engage nuts 34, which are formed with or secured to the cross-head, as in Fig. 12, and arranged to extend back through slots 34 in the horns, in order to bring them into position for the adjusting-screws.

The mechanism employed for operating the adjusting-screws so as to adjust in height the cross-head is arranged so as to be under the control of an operator at the feed end of the machine. This mechanism is also in operative connection with devices for raising and lowering the upper pressure-roll, 35, of the pair of feeding-out rolls I, in which way the vertical adjustment of said roll and of the cutter-cylinder can be simultaneously effected. To the end that said members may be thus adjusted and controlled in their adjustment, the rod 36 is provided at one end with a suitable handle or hand-wheel, O, and appropriately mounted to turn in bearings that are arranged so as to bring the hand-wheel within reach of the operator at the feed end of the machine. The rod is extended back to a point over one of the horns, at which point it is supported in a suitable bearing, 37, upon the horn and provided with a small miter or bevel gear, 38, arranged to engage a somewhat larger bevel-gear, 38$^a$, that is fixed upon one end of a horizontal line-shaft, 39. This shaft is arranged and mounted in bearings 40 upon the frame formed by the horns and their connecting cross-piece, and is further provided with the bevel-gears 41 41. The gears 41 engage the gears 42 of and at the upper ends of the adjusting-screws 33, in which way, by turning the rod 36, the adjusting-screws can be operated to raise and lower the cross-head.

The foregoing mechanism for actuating the adjusting-screws 33 is connected with the boxes of the upper idler-roll of the feeding-out rolls through the medium of a simple arrangement of motion-transmitting devices, as follows: The horizontally and longitudinally disposed shaft 43 is arranged to extend back from the connecting cross-piece 32 of the horns to a cross-piece, 44, that connects together the upper ends of the two standards P for the housings of the upper feeding-out roll. Said shaft 43 is conveniently mounted in bearings 45 and 46, respectively secured upon one and the other of said two cross-pieces, and is provided at its forward end with a bevel-gear, 47, that engages a similar gear, 48, upon the shaft 39. At its rear end the shaft 43 is provided with a bevel-gear, 49, arranged in mesh with a similar gear, 50, of the horizontal and transversely arranged rotary shaft 51, which latter is appropriately mounted upon the cross-piece 44 of the standards for the housing of the feeding-out rolls, and provided at its ends with the bevel-gears 52, (see Fig. 5,) that in turn engage and actuate bevel gear-nuts 53, applied to turn on suitable bearings upon the cross-piece 44. These gear-nuts serve to raise and lower the boxes 54 for the upper feeding-out roll, 35, (or, more properly, the pressure-roll arranged over the feeding-out roll,) for which purpose the housings 55 (see Fig. 2) for said boxes are arranged to slide up and down along the guideways of the standards P, and are appended to the lower ends of the screw-rods 56, which extend up through the gear-nuts 53. In this way, when the long shaft or rod 36 is turned, the system of geared shafting between the gears upon the adjusting-screws 33, for raising and lowering the cross-head, and the gear-nuts 53, for raising and lowering the threaded rods carrying the housings for the boxes of roll 35, will be operated synchronously throughout, and thus the said roll and the cutter-cylinder raised and lowered simultaneously.

The height of the cutter-cylinder above the feed-bed can be readily known and determined by means of a gage device, Q, Figs. 2 and 3, arranged at the feed end of the machine, and conveniently over one corner portion of the main frame. The scale 57 of this gage device is for convenience arranged upon a standard, 58, that rises from the main frame, and serves to further provide a bearing for the rod 36 of the roll and cutter-cylinder adjusting mechanism. The pointer or index-finger 59 of the gage device is carried by a vertically-arranged slide-rod, 60, that is arranged to work through a guide, 61, upon the standard 58, and controlled in position from the cross-head that supports the cutter-cylinder. The connection between said slide-rod and the cross-head is attained by a vibratory lever, 62, Fig. 2, pivoted intermediate of its ends to one side of the main frame, as at 63, and jointed at one end to the slide-rod 60, its opposite end being connected with the cross-head by a suitable rod or link, 64, which is hinged to the cross-head, as at 65. In this way an adjustment of the cross-head, either up or down, will effect a corresponding movement on the part of the slide-rod carrying the index-finger, and thus the position of the latter relative to the scale will permit the operator standing at the feed end of the machine to readily determine the height of the cutter-cylinder without leaving his post.

As a means for locking the cross-head in its adjustment, and for placing the locking devices for such purpose under control of the operator standing at the feed end of the machine, the cross-head M is provided with a pair of adjustable stops or frictional clamp-blocks, R, operative through openings 66 in the cross-head, and arranged between the horns in such relation thereto that they can be moved apart to bind against the horns, and thus lock the cross-head, or drawn toward each other, so as to release their pressure against the horns, and thus permit the cross-head to be moved either up or down. The openings or mortises 66, formed to permit such adjustment of the blocks laterally to the horns, and the device for simultaneously adjusting the blocks apart or toward each other, are best shown in Fig. 12. Said device for adjusting the blocks consists of a horizontal rod, 67, arranged along the front side of the cross-head, and engaging the blocks in a way to cause a partial rotation of the rod one way to throw the blocks apart and tighten them up against the horns, and to cause a reverse partial rotation of the rod to draw the blocks away from the horns to an extent sufficient to relieve their binding action against the horns. To such end the rod, which is mounted in a suitable bearing on one end of the cross-head, passes through a plane cylindric bore through the forward projecting portion of one block, but is threaded, as at 69, to engage a threaded bore or socket in the forward projecting portion of the remaining block. At a point adjacent to the block having the smooth bore the rod is, however, provided with a fixed collar or shoulder, 70, Fig. 6, arranged to bear against what may be termed the "inner side" of the block. The rod extends at one end out from the cross-head, and is provided with an upwardly-extending arm, 71, which at its upper free end is pivotally connected with a shifter-rod, 72, arranged to extend forward to the feed end of the machine, where it is conveniently upheld by an appropriate guide on the standard 57.

By means of the shifter-rod 72 and the arm 71 the rod or shaft 67 can be turned either way by an attendant standing at the feed end of the machine, and by means of the organization of the rod 67 and the blocks the latter can be adjusted as follows: When the rod 67 is turned in a direction to unscrew its threaded portion, the two blocks will be forced against the horns, the increasing distance between its shoulder 70 and the block engaged by the threaded end of the rod necessarily serving to force the blocks apart and against the horns. When, however, the rod 67 is turned in a reverse direction, it will of necessity screw up into one of the blocks, thus shortening the distance between said block and the shoulder or collar, and relieving the blocks of their binding action against the horns. The rear portion of each block is provided with a plate, 74, having a bevel, $71^a$, Fig. 12, in opposition to a like beveled portion, $72^a$, along the horn that is adjacent thereto. The blocks are somewhat widened over the front face of the cross-head, and the beveled plates 74, that are secured to the rear sides of the blocks so as to practically constitute portions thereof, are extended somewhat over the rear side of the cross-head, with their beveled edges arranged to lie against the bevel-ways $72^a$ of the horns, in which way the blocks are securely but adjustably held in the cross-head by connections permitting them to be locked against or loosened from the aforesaid beveled portions of the horns.

The divided pressure-roll C (see, especially, Fig. 7) consists of the two independent roll-sections, 75 75, that are supported in front of the cutter-cylinder when in a properly-operative position. The frames or housings 76, in which the roll-sections are separately journaled, are susceptible of a desired extent of vertical play, and are normally depressed by the short half-elliptic springs 77 77, each arranged over one of the housings 76 with its ends bearing thereon. The springs 77 are each yoked or clipped at its middle to the long equalizer-bar, S, which is arranged over the two housings and susceptible of an up-and-down movement proportional to the action of the springs, that are thus placed intermediate of the equalizer-bar and the two housings. The long half-elliptic spring 78 is arranged over the equalizer-bar, with its ends bearing upon the latter and its middle secured to the plate or support, alongside which the equalizer-bar, lower springs, and housings are located. The lower half-elliptic springs being independent of each other, so far as their individual or direct actions are concerned, permit the roll-sections to adapt themselves to two pieces of lumber of different thicknesses, and also permit each roll-section to adapt itself to any irregularity in the thickness of the piece of lumber that may be passing under it. The upper larger spring is, however, common to both of the lower direct-acting springs, and is capable of rocking to some extent, so that while permitting the desired extent of lift on the part of both roll-sections it will, when one roll-section is raised higher than the other, act as an evening or distributing spring. The equalizing-bar will also be capable of tilting for a like purpose, and hence, if guided in its up-and-down movement, will be guided with reference to the desired latitude of end-tilt. The upper spring is especially serviceable where, by reason of the thickness of the material passing under either or both roll-sections, the lower springs have yielded to the upward pressure to their practical limit of flexure and an additional yielding-spring resistance to the upward pressure becomes necessary. This further yielding-spring resistance is obviously attained by the upper spring, which, by reason of the long equalizing-bar, can be made of a length equal to any demands that may be made upon it through either or both of the lower springs. Thus, as herein shown, the ends of the upper main spring extend considerably beyond the points at which the lower springs are held against the bar. With regard, however, to the provision of the equalizing or balance bar in connection with the divided pressure-roll and springs, no claim to such organization or combination is herein made, since said feature constitutes the subject of a claim in my former application, Serial No. 171,811, and while the same is of especial value in connection with and particularly applicable to the hinged gate of the present machine, other arrangements of spring-controlled pressure-rolls could obviously be appended to said gate.

The support for the upper spring, 78, consists of a gate or hinged plate, T, provided at the middle of its upper portion with an upward extension, 79, to which is adjustably bolted a box or clip, 80, designed to hold the long upper spring, 78, at its middle. The frame or housings 76 are arranged against the front side or gate of the plate T, and are guided in their up and down movements by means of suitable guides upon the plate.

The plate or gate T is hinged at one end at the front side of the cross-head M, a convenient arrangement being to provide each one of the boxes 30 that is on the front side of the cross-head with a bracket, 82, so that the gate may be hinged at one end to one of these brackets, and its free end temporarily locked to the other. When the gate is in a closed position—that is to say, when its free end is brought into a position to be locked—it will stand in a vertical plane parallel with the axis of the cutter-cylinder, and will extend down to a point, which, while at a sufficient elevation above the feed-bed to permit the passage of the lumber, will be comparatively low down, so as to provide a backing and guides for the housings of the roll-sections that will avoid an undesirable extent of leverage between the immediate bearings for the divided roll-journals, and the lowest point of the guide-backing for the housings will under all circumstances work freely. The free end of this gate can be temporarily locked by bolts or other desired means, and is preferably provided with one or more dowel-pins, 83, Fig. 6, arranged to enter sockets in the bracket that is opposed to the free end of the gate when the latter is closed, this feature being desirable to prevent sagging of the gate or to raise its free end to the same height as its hinged end in bringing the gate into position to be locked. The gate can be swung forward from the position shown in Figs. 3, 4, and 7, and swung round to the position shown in Figs. 2 and 6, wherein it is represented as standing at one side of the machine. When the gate has been thus swung round and away from its usual position in front of the cutter-cylinder, the latter will be fairly exposed, as in Fig. 6, wherein it will be seen that no obstacle whatever will be left standing in front of the cutter-cylinder, to prevent free and convenient access to be had to the same for the purpose of sharpening the knives, or for such other ends as may necessitate access to the cutter-cylinder. The chip-breaker D is also carried by the hinged gate T, and is arranged back of the divided pressure-roll. The chip-breaker, like the pressure-roll C, is divided or composed of two independent sections, 84 84, each attached to the rear side of the gate by a connection that permits a limited extent of vertical play on the part of the chip-breaker sections independently of the hinged gate to which they are attached.

As a convenient way of attaining a sliding connection between the chip-breaker sections and the gate, the latter is provided with dovetailed or L-shaped ribs 85, that fit correspondingly-shaped grooves in the body portion of the chip-breaker, as illustrated in Fig. 4.

In order to limit the extent of drop on the part of the chip-breaker sections, appropriate stops are provided—for example, as in Fig. 13, wherein the gate is shown provided with a stop, 86, arranged to extend back into a groove, 87, that is formed vertically in the body portion of one of the chip-breaker sections. In such construction the end wall of the upper terminal of the groove serves as a shoulder, which, when seated upon the stop, serves to limit further drop of the chip-breaker section independently of the gate. The chip-breaker, which is in front of the cutter-cylinder, can, by reason of its attachment to the hinged gate, be readily swung away from in front of the cutter-cylinder, and thus entirely clear the way to the latter.

The chip-breaker herein shown acts as a heavy or weighted pressure-bar; but it will be obvious that desirable results could be attained with a chip-breaker having a rolling in place of a stationary surface; and to such end it will be understood that a pair of pony-rolls carried by the gate in place of and in a manner similar to the form of chip-breaker herein shown would be an obvious equivalent thereof without special illustration. The divided or sectional pressure-roll and the divided or sectional chip-breaker are thus self-adjusting with relation to the gate; but by reason of their connection with the latter, and of the connection of the gate with the cross-head that carries the cutter-cylinder, the said roll, chip-breaker, and cutter-cylinder can all be simultaneously raised or lowered by adjusting the cross-head, which by necessity effects an adjustment common to all the said members, and permits their general position to be readily established by an operator or attendant standing at the feed end of the machine, while at the same time the respective capabilities of the pressure-roll and the chip-breaker for self-adjustment are fully preserved.

The pressure-roll F, Fig. 3, that is arranged back of the cross-head, and consequently in rear of the cutter-cylinder, is carried by the cross-head and is spring-controlled, to which end the bearings for its journals are arranged to slide in suitable boxes or guides, 88, that are attached to the rear side of the cross-head. The spring or springs 89 are attached to clips or brackets, likewise secured to the cross-head, with the ends of the spring or springs, as the case may be, arranged to normally depress the bearings for the pressure-roll. By this arrangement the pressure-roll is self-adjusting under spring-pressure, but is raised or lowered with the cross-head, so that its proper relationship to the thickness of the work leaving the cutter-cylinder is at all times maintained. The side cutter-heads are partially encircled by separate frames or guards 90, that are arranged opposite the outer sides of the cutter-heads, and provided with bearings appropriate for the upper ends of the vertical cutter-head spindles 91. The cutter-head spindles are mounted and driven alike, Figs. 3 and 10 serving to illustrate this feature of the machine. As herein shown, the frame 90 rises from a bracket, 92, that is adjustably secured to a cross-bar, 93, of the main frame, and extended down between the sides of the latter. The spindle works in bearings formed through the bracket at points immediately above and below its cutter-head, and within a short distance below its belt-pulley 94; but at its lower terminal the spindle is stepped upon a steel bearing, 95, that is adjustably secured in the bracket, and adapted to sustain the weight of both the spindle and the cutter-head. A suitable oiler, U, is provided for lubricating the bearings for the lower end portion of the spindle, which, with regard to the bearing 95, will permit the constant presence of a supply of lubricant for the same. The spindles are belted from a single counter-shaft, V, that is mounted at a point beyond or in rear of the delivery end of the machine.

The belts 96, that are employed to connect the pulleys 94 of the vertical spindles with the pulleys 97 of the horizontal counter-shaft, are for the greater portion of their length carried back horizontally from the pulleys of the cutter-head spindles. To attain such end the lower leaves of the belts pass over idler-pulleys 98, arranged upon a shaft directly in front of the counter-shaft. The upper leaves of the belts run directly and horizontally between the spindles and the pulleys 97, while the lower leaves of the belts, after leaving the said pulleys are raised by the idler-pulleys, so as to run horizontally between the latter and the spindles. In this way the belts exert a direct pull upon the spindles in a direction lateral to their respective axes, and at the same time permit the machine to be belted from a single counter-shaft arranged in rear of the delivery end of the machine. The cutter-cylinder is also belted from the counter-shaft V, to which end the pulleys 99 on the cutter-cylinder are belt-connected with the pulleys 100 on the counter-shaft.

As a further disposition of belting, the train of gearing W, that is arranged at one side of the machine, as shown in Fig. 2, and provided for actuating both the lower feeding-out roll and the shaft that carries the sprockets for operating the feed-bed, is driven from a belt, 101, Fig. 1, arranged to connect a pulley, 102, on the counter-shaft with a pulley, 103, that is fixed upon a shaft, 104, and arranged at the side of the machine that is opposite to the side whereat the said train of gearing is located.

The foregoing arrangement of belting dispenses with the necessity of hanging carriers, permits an advantageous line of pull on the part of the belts, and prevents the belts from running off their allotted pulleys.

The belt 101 can be tightened from the feed end of the machine by a belt-tightener, X, connected with and actuated by a system of levers and connections arranged to extend to the feed end of the machine, as shown in Fig. 4.

As a further detail of the machine, may be noted the adjustable guide-pieces 105, Fig. 5, that are arranged at the delivery ends of the machine in opposition to the guides H. The object of these guide-pieces is to properly direct the lumber as it leaves the machine, it being observed that the guides H will usually diverge somewhat toward their rear ends, and hence, as the outgoing pieces of lumber will have a tendency to deflect to opposite sides of the machine, the guide-pieces 105 will arrest such deflection at the proper points. It is understood that while the two guides have an action common to the general capacity of the machine, so far as relates to an adjustment of said capacity for two pieces of lumber, one guide might be taken off and the other used to vary the working-space with particular reference to either one of the two side cutter-heads.

In conclusion, it may be observed that the arrangement of the spindles of the side cutter-heads and the manner of belting the same involve the feature of a vertical spindle having a bearing at each side of its pulley; also, that the mode of stepping the spindle and belting the same involves novelty and utility, and in conjunction with said features the oiler also adds to the efficiency of this portion of the machine.

What I claim as my invention is—

1. In a surfacer and sizing-machine for dressing down in width and thickness two pieces of lumber at one and the same time, the two longitudinally-arranged guide-bars, combined with and passing between the oppositely-arranged side cutter-heads and movable laterally and independently of each other and of the side cutter-heads to an extent to afford between the two cutter-heads and the pair of guides two separate working-spaces for two separate pieces of lumber of equal or of unequal width, said guide-bars being also movable laterally toward either cutter-head to an extent to provide in front of either cutter-head a space substantially equal in width to the distance between the two cutter-heads, less the space occupied by the two guides, whereby a single piece of unusually wide lumber can be run through the machine, and separate adjusting mechanisms for and susceptible of separately shifting the guide-bars to effect the said several adjustments thereof, said members being organized for operation substantially as shown and described, and for the purpose set forth.

2. A surfacer and sizing-machine for dressing down in width and thickness two pieces of lumber at one and the same time, provided with a transversely-arranged horizontal cutter-cylinder mounted over an endless traveling feed-bed, a pair of oppositely-arranged rotary cutter-heads situated at one side of the cutter-cylinder, the two guide-bars H, extending substantially the length of the machine, and separate adjusting mechanisms for separately adjusting the guide-bars, said guide-bars being movable independently of each other and of the said side cutter-heads, and being susceptible of adjustment toward or away from a point intermediate of the side cutter-heads to provide separate working-spaces of equal or unequal width in front of the latter, all combined and organized for operation substantially as described.

3. A surfacer and sizing-machine for dressing down lumber in width and thickness, provided with the two guide-bars H, passing between the rotary side cutters, and movable independently of each other and of the said side cutters, combined with the sliding saddle-pieces supporting the guide-bars, and in turn supported upon guides arranged transversely to the guide-bars, the two sets of adjusting-screws engaging the saddle-pieces, and the rotary side rods respectively arranged at opposite sides of the machine, and each geared to one pair of said adjusting-screws, said rotary side rods being respectively extended to opposite corners of the machine at the front or feed end thereof, substantially as shown and described.

4. The guide-bar passing between the two side cutter-heads and combined with the two sliding saddle-pieces that are adapted to receive pins with which the guide-bar is provided, and the hand-screw for locking the guide-bar to the forward one of the two saddle-pieces, substantially as described.

5. The vertically-adjustable cross-head carrying the rotary cutter-cylinder, and a roll situated over the feeding-out roll and mounted in vertically-adjustable bearings, combined with screws for raising and lowering the cross-head and the bearings for said upper roll, and an adjusting mechanism for simultaneously operating said screws, consisting of a system of geared shafting connected with the screws for raising and lowering both the said roll-bearings and the cross-head, and including a rotary shaft that is extended to the feed end of the machine, whereby the adjusting mechanism can be operated from said end of the machine, substantially as described.

6. The vertically-adjustable cross-head carrying the cutter-cylinder, combined with the pointer carried by a vertical slide-rod and disposed to indicate the height of the cutter-cylinder upon a scale at the feed end of the machine, and the pivoted lever connected at one end with said slide-rod and at its opposite end linked to the cross-head, substantially as set forth.

7. The vertically-adjustable cross-head carrying the horizontal cutter-cylinder, which is operated over the feed-bed, in combination with the horizontally-swinging gate T, hinged at one end to the cross-head, and swinging laterally toward and away from the latter, said gate being provided with a self-adjusting pressure-roll, and being arranged to stand, when closed, in a plane in front of said cutter-cylinder and in position to bring the pressure-roll in co-operative relationship to the same, the point of location of this gate with relation to the organized machine being between the feed end of the latter and the upright guides that are provided for the adjustable cross-head, substantially as described.

8. The cross-head adjustably held upon the front inclined faces of the horns N, which said faces are in a plane rising from the main or body frame of the machine, and leaning toward the rear or delivery end of the latter, combined with the cutter-cylinder carried by the said cross-head, and the gate T, provided with a self-adjusting pressure-roll, and hinged to and swinging horizontally and laterally with relation to the cross-head, said gate being arranged to stand, when closed, in a vertical plane just in front of the cutter-cylinder, which is carried by the cross-head, and when in such position to bring the pressure-roll in co-operative relationship to the said cutter cylinder, substantially as described.

9. The combination, with the adjustable cross-head carrying the cutter-cylinder, of the gate T, hinged to and swinging laterally from said cross-head, and, when closed, standing in a vertical plane in front of the cutter-cylinder, and the chip-breaker carried by said gate, substantially as described.

10. The combination, with the adjustable cross-head carrying the cutter-cylinder, of the gate T, hinged to and swinging laterally from said cross-head, and the divided chip-breaker composed of independent sections each having a limited vertically-sliding connection with the swinging gate, substantially as described.

11. The vertically-adjustable cross-head carrying the cutter-cylinder, combined with the clamp-blocks carried by the cross-heads and adjustable against and away from the cross-head supports, and the adjusting-rod for simultaneously forcing the clamp-blocks against the cross-head supports or for relieving their pressure thereon, substantially as and for the purpose described.

12. The cross-head carrying the cutter-cylinder, the clamp-blocks, and the adjusting-rod therefor, substantially as described, in combination with an arm attached to the adjusting-rod, and a shifter-rod connected with said arm, and extending forward to the feed end of the machine, substantially as described.

13. The horns N, having their front side inclined or leaning toward the delivery end of the machine, combined with the cross-head carrying the cutter-cylinder and adjustably held upon said inclined sides of the horns, and a gate, T, carrying the pressure devices hinged to the front side of the cross-head, the said cutter-cylinder being belted from the delivery end of the machine, whereby when the cross-head is raised or lowered a proximately uniform tension shall be maintained upon the belt, all substantially as described.

14. The guide-bar H, extending between the side cutter-heads, combined with the adjustable saddle-pieces upon which it is supported, said saddle-pieces being provided with sockets formed in their vertical sides that are nearest the feed end of the machine, and the guide-bar being provided on its under side with the horizontal dowel-pins, which, when the bar is in place upon the saddle-pieces, fit in the sockets of the latter, whereby to detach the guide-bar it is necessary to first draw the same toward the feed end of the machine, substantially as described.

15. One or more guide-bars, H, disposed between the side cutter-heads, in combination with the sliding saddle-pieces supported upon cross-bars of the main frame, and having nuts that are confined within but adapted to traverse channels in the under side of the cross-bars, and the adjusting-screws engaging said nuts and operated within said channels, substantially as described.

16. The combination, with the main frame, of the standard rising from one of the feed-end corners thereof, the mechanism for raising and lowering the cross-head, consisting of screws for directly adjusting the cross-head and a system of geared shafting connected to said screws, and including a rotary actuating rod or shaft extended to and mounted at one end in said standard, and a mechanism for locking the cross-head in its adjustment, likewise having an operating-rod that is supported at one end by the said standard, substantially as described.

17. The rotary rod 36, geared to a rotary shaft, 39, that is mounted over the horns, and the gear connected with the adjusting-screws for raising and lowering the cross-head, combined with the rotary shaft 43, that is geared to both the said shaft 39 and to a rotary shaft, 51, that is mounted over the standards P and geared to gear-nuts applied upon threaded rods for raising and lowering a roll over the feeding-out roll, substantially as described.

LUCIUS P. HOYT.

Witnesses:
CHAS. G. PAGE,
FRANK W. LEVERIN.